United States Patent [19]

Vuong

[11] Patent Number: 5,303,095
[45] Date of Patent: Apr. 12, 1994

[54] SYSTEM AND METHOD OF CONTROLLING DATA TRANSFER RATE IN A MAGNETIC TAPE DRIVE

[75] Inventor: Binh Vuong, Simi Valley, Calif.
[73] Assignee: Wangtek, Inc., Simi Valley, Calif.
[21] Appl. No.: 991,080
[22] Filed: Dec. 14, 1992

Related U.S. Application Data

[63] Continuation of Ser. No. 614,162, Nov. 13, 1990, abandoned.

[51] Int. Cl.⁵ .................. G11B 5/09; G11B 15/46; G11B 15/48
[52] U.S. Cl. .................. 360/46; 360/73.08; 360/74.1
[58] Field of Search .......... 360/46, 52, 69, 73.05, 360/73.06, 73.07, 73.08, 74.1

[56] References Cited

U.S. PATENT DOCUMENTS

| | | | |
|---|---|---|---|
| 3,774,156 | 11/1973 | Marsalka et al. | 340/172.5 |
| 3,824,551 | 7/1974 | Arciprete et al. | 340/172.5 |
| 4,044,389 | 8/1977 | Oldershaw et al. | 360/73 |
| 4,176,380 | 11/1979 | Koski et al. | 360/50 |
| 4,258,418 | 3/1981 | Heath | 364/200 |
| 4,373,171 | 2/1983 | Dengler et al. | 360/71 |
| 4,382,268 | 5/1983 | Frimet | 360/73.05 |
| 4,531,166 | 7/1985 | Anderson | 360/73.04 |
| 4,542,457 | 9/1985 | Mortensen | 364/200 |
| 4,644,463 | 2/1987 | Hotchikin et al. | 364/200 |
| 4,689,767 | 8/1987 | Stevenson et al. | 364/900 |
| 4,788,641 | 11/1988 | Ishiguro et al. | 364/200 |
| 4,858,039 | 8/1989 | Mintzlaff | 360/72.2 |
| 4,860,193 | 8/1989 | Bentley et al. | 364/200 |
| 4,899,147 | 2/1990 | Schiavo et al. | 341/60 |
| 4,912,572 | 3/1990 | Nomura et al. | 360/46 |
| 4,943,907 | 9/1990 | Godwin | 364/200 |
| 4,967,289 | 10/1990 | Kanota et al. | 360/46 |
| 4,987,502 | 1/1991 | Freeze | 360/69 |

FOREIGN PATENT DOCUMENTS 62-7239  6/1987  Japan.
2-310619  4/1990  Japan.

Primary Examiner—Donald Hajec
Assistant Examiner—Won Tae C. Kim
Attorney, Agent, or Firm—Robbins, Berliner and Carson

[57] ABSTRACT

A system and method for slowing the data transfer rate in a magnetic tape cartridge drive is presented for a better match in transfer rates between a host computer and the drive. The transfer is slowed after the start of the data transfer operation to selected transfer rates below the nominal transfer rate of the drive. The requirements of density of data on the magnetic tape remains unaffected so that the magnetic tapes are interchangeable with present drives.

33 Claims, 4 Drawing Sheets

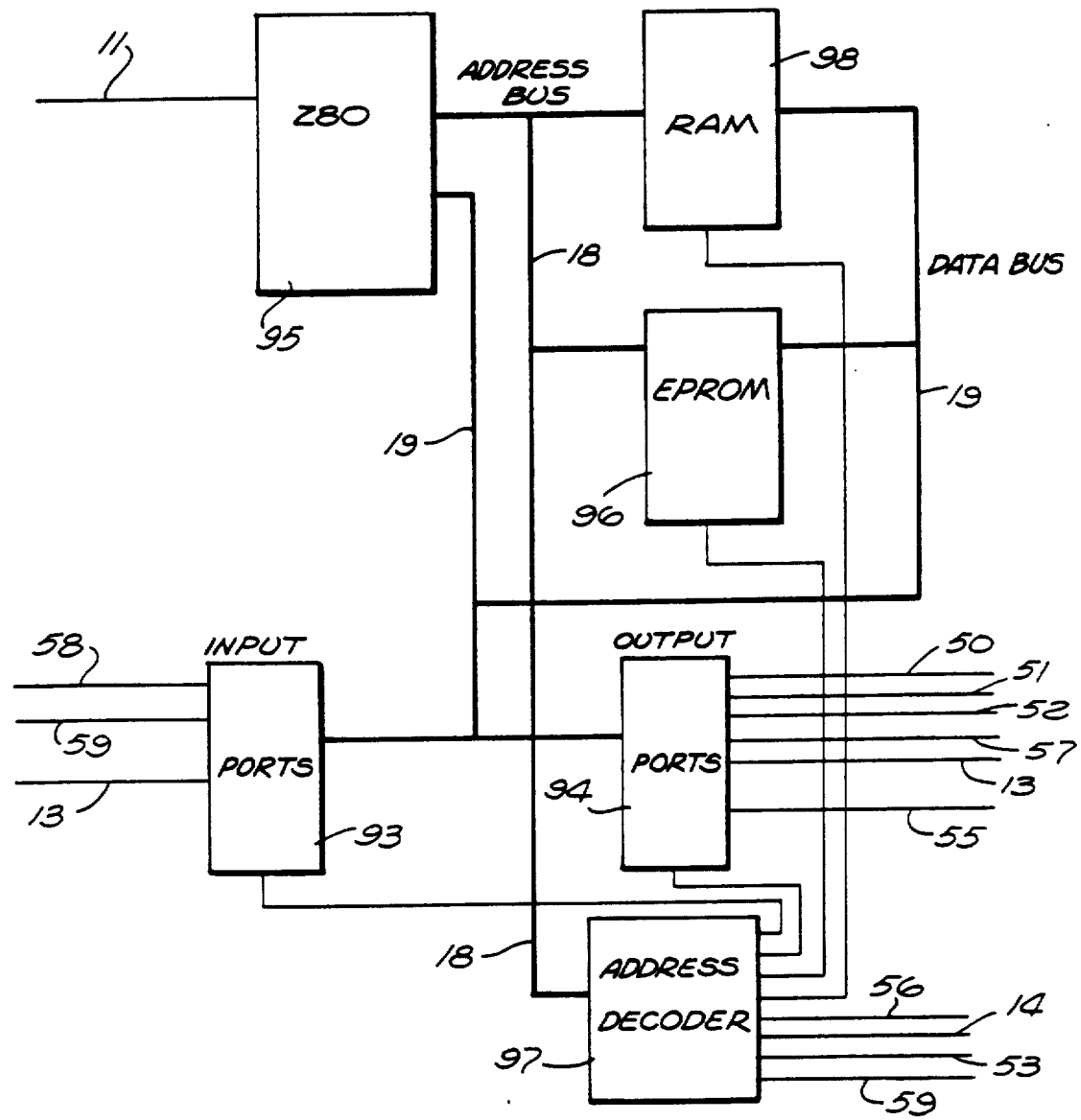
FIG. 4 CONTROL BLOCK DIAGRAM

SYSTEM AND METHOD OF CONTROLLING DATA TRANSFER RATE IN A MAGNETIC TAPE DRIVE

This is a continuation of U.S. application Ser. No. 07/614,162, filed Nov. 13, 1990, now abandoned.

BACKGROUND OF THE INVENTION

The present invention relates to magnetic tape drives useful in storing data in computer systems and, more particularly, to the control of data transfer rates between a magnetic tape cartridge drive and a host computer.

In magnetic tape cartridge drives, such as the quarter-inch cartridge drives, the drives are designed to move a magnetic tape past the magnetic heads at predetermined speeds and to lay down, or write, or to receive, or read, the data signals at a predetermined density on the magnetic tape. For example, in a QIC-525 standard drive the tape is driven at 120 inches per second and data is written onto, or read from, the tape with a density of 20,000 flux changes per inch.

These magnetic tape cartridge drives have a buffer which acts intermediate storage unit between the magnetic tape and the host device, the computer. The buffer is useful because typically the data transfer rates of the computer and the drive do not match.

Present magnetic tape cartridge drives handle the problem of disparate transfer rates between the drive and the host computer by interruptions, i.e., stopping the drive until the slower computer can catch up. During a read operation, for example, the faster drive may quickly fill the buffer as the host computer accepts the data from the buffer. At that point the drive is stopped until the computer can empty the buffer before the drive begins again transferring data from the tape into the buffer. During a write operation, the faster drive may completely empty the buffer as the computer feeds data into the buffer for writing onto the magnetic tape. When the buffer is filled again, the drive is started once more.

This stop-and-start activity is hard upon the mechanical parts of the drive. Errors may occur in the transfer of the data and the drive may even break down.

SUMMARY OF THE INVENTION

The present invention solves this problem of the disparity of the transfer rates between the magnetic tape cartridge drive and the host device. The present invention monitors the stop-and-start activity of the drive during data transfer operations. If this activity exceeds a predetermined amount, the drive is slowed, or throttled, to a transfer rate nearer that of the host device. Throttling occurs "on the fly," i.e., after the beginning of the tape or the load point of the tape. Furthermore, throttling is achieved with the signal density on the tape remaining the same so that tape cartridges are interchangeable with those from existing drives. In this manner the stop-and-start activity of the drive is eliminated or substantially reduced.

The present invention provides for a magnetic tape cartridge drive system having a buffer for transferring data between a host device and a magnetic tape at a nominal data transfer rate. The drive is capable of lowering said data transfer rate.

The drive has a control block controlling the transfer of data between the host device and the magnetic tape, a servo controller, which controls the speed of the tape responsive to control signals from the control block, an oscillator generating periodic signals, and a divider coupled to the oscillator and to the control block for generating a clock signal of selectable frequency responsive to control signals from the control block.

Responsive to the state of the buffer, the control block generates control signals to the divider for lowering said clock signal frequency and to the servo controller for slowing said tape speed. In this manner the data transfer rate is slowed.

In accordance with another aspect, the present invention provides a method of transferring data between a host device and a magnetic tape by running a tape drive to transfer data signals between a magnetic tape and a tape drive buffer at a tape drive data transfer rate, transferring digital data between a host device and said tape drive buffer at a host data transfer rate, transferring buffered data between said magnetic tape and said host device by way of said tape drive buffer, interrupting said tape drive running to reduce disparity between said tape drive and said host data transfer rates during said buffered data transfer, monitoring said buffered data transfer, and changing said tape drive data transfer rate in response to said monitoring to reduce said interrupting.

In accordance with a still further aspect, the present invention provides a magnetic tape drive system including a buffer, tape drive means for moving magnetic tape at a controlled speed, means for transferring data between a host device and said magnetic tape by way of said buffer at a nominal data transfer rate between said magnetic tape and said buffer, servo controller means for controlling the speed of said tape, oscillator means for generating a clock signal of selectable frequency, and control block means for changing said clock signal frequency and for changing said controlled tape speed responsive to a state of said buffer to change said data transfer rate after said data transfer has begun.

BRIEF DESCRIPTION OF THE DRAWINGS

An understanding of the present invention may be achieved by the following Detailed Description of Specific Embodiment(s) and the following drawings:

FIG. 4 is one embodiment of the control block in FIG. 1.

DETAILED DESCRIPTION OF SPECIFIC EMBODIMENT(S)

Figure 1:
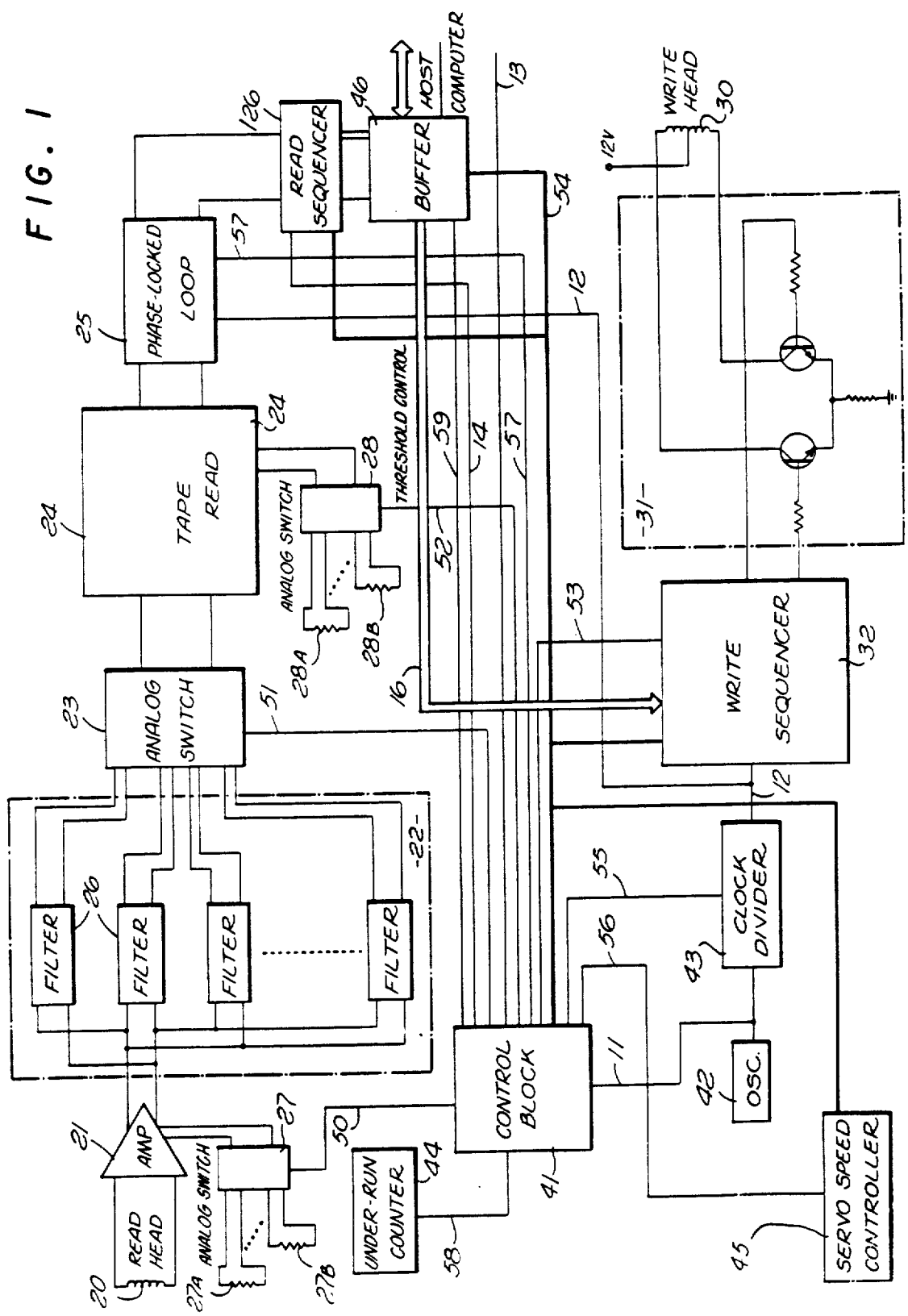
FIG. 1 is a block diagram of a magnetic tape cartridge drive system according to the present invention.

FIG. 1 is a block diagram of a magnetic tape cartridge drive system according to the present invention. The system contains features found in present magnetic tape cartridge drive systems and thus these features are known to those skilled in the art. This description is directed toward a detailed discussion of the particular features related to the present invention.

As typically found in present tape drives, the general system of FIG. 1 has a read head 20 which receives the data signals on a magnetic tape. The read head 20 contains a read head gap which helps generate the electrical signals responsive to the signals previously written upon the magnetic tape. The read data signals are placed in a buffer 46 from which the signals are transferred to the host device, the computer. Data signals moving in the opposite direction are received from the host computer and stored in the buffer 46. Then the data signals are passed to a write head 30 which writes the signals upon a magnetic tape. The write head 30 has a write head gap which helps create the magnetic signals for placing the data signals on the magnetic tape.

The system is controlled by a control block 41. Typically the control block 41 is implemented by a microcontroller, such as an 8XC52 sold by Signetics Corporation of Sunnyvale, Cal., or a microprocessor with external memory.

An oscillator 42 generates timing signals for the drive system. A servo controller 45, under the instructions of the control block 41, runs a motor servo which moves the magnetic tape past the read and write heads 20 and 30.

The system of the present invention also has a preamplifier block 21, which amplifies the signals from the read head 20. An integrated circuit amplifier, such as an LM529 by National Semiconductor Inc. of Santa Clara, Cal., can be used for a preamplifier block 21. The gain of the block 21 may be controlled in response to control signals from an analog switch 27 responsive to the control block 41. The analog switch 27 is connected to several different resistances, here shown exemplarily as resistances 27A and 27B. The switch 27 digitally selects a particular resistance to control the gain for the block 21.

The amplified signals are sent to a selective filter block 22. The selective filter block 22 has several parallel filter circuits 26, each of which receives the differential signal from the preamplifier block 21. Each filter circuit 26 acts as a pulse slimming filter to condition the signals at a predetermined mean frequency range. The nominal frequency range for each filter is selected to be centered about one of the predetermined lower transfer rates to which the magnetic tape drive may be throttled back according to the present invention. In a QIC-1350 standard tape drive, for example, the nominal transfer rate is 600K bytes/sec. The lower transfer rates may be 450K, 300K, 200K and 100K bytes/sec. and the filter ranges chosen accordingly.

Besides a plurality of parallel filters 26, an alternative way of implementing the selective filter block 22 is with a programmable active filter device. This type of integrated circuit which is suitable for magnetic tape cartridge drives is just being introduced into the present market. Possible sources of these devices include IMP Co. of Santa Clara, Cal. and SSI Co. of Tustin, Cal.

From the filter block 22, the differential output signals of the filter circuits 26 travel to an analog switch 23, which selects the signals from one of the filter circuits 26 in response to a control signal on a line 51 from the control block 41.

The selected differential signals then travel to a tape read block 24 which amplifies and forms the signals into true digital signals. An integrated circuit from National Semiconductor Corp. of Santa Clara, Cal., a DP8464, may be used for the tape read block 24. Through control signals over the line 52, an analog switch 28 digitally selects different resistances, exemplarily shown as resistors 28A and 28B, to set the threshold for the block 24. The threshold is set depending upon whether the drive is in a read or write mode, and the amount by which the drive is being throttled, or slowed.

The digital signals from the tape read block 24 are then passed to a phase-locked loop 25, which can be implemented by ADP8459 integrated circuit from National Semiconductor Corp. of Santa Clara, Cal. Besides the digital signals from the tape read block 24, the phase-locked loop 25 receives a clock signal on a line 12 and a control signal from the control block 41 on a line 57. The phase-locked loop 25 uses a reference frequency of the incoming clock signal on the line 12 to precisely lock and convert the raw data signals read from the head 20, which reads signals in the form of magnetic flux changes on the tape, to digital output signals. A phased locked loop clock signal are also generated as a read clock signal.

Both data and clock signals are transmitted to a read sequencer block 126 over two lines. The block 126 decodes the data, which is typically encoded on the magnetic tape, and checks the data, if, for example, cyclic redundancy checking is used on the data, and converts the serial data into parallel data. To perform these functions the block 126 is connected to an address and data bus 54 and a control line 14 from the control block 41.

The data is then transferred in parallel to the buffer 46, which holds the read data signals for the host computer. A line 59 sends status signals of the state of the buffer 46 to the control block 41 and receives control signals from the control block 41. Thus the control block 41 knows whether the buffer 41 is full or empty and can interrupt data transfer operations when necessary. The buffer 46, which also contains a buffer controller, also communicates with the control block 41 over the address and data bus 54 so that the control block 41 exercises the necessary control over the buffer 46.

For write operations the system of the present invention has a write sequencer block 32 which receives data signals from the buffer 46. The buffer 46 receives data signals from the host computer to be written upon the magnetic tape and transfers the signals in parallel to the write sequencer block 32 over a bus 16. The timing of the block 32 is controlled by a clock signal from the clock divider 43 on the line 12. The block 32 encodes the data serially and generates differential signals in a selected format to a head drive block 31. The block 32 is also connected to the address and data bus 54 and a control line 53 from the control block 41 so the block 32 can perform all the typical functions in a sequencer block.

The write sequencer block 32 may be implemented by a single integrated circuit, such as a 9801 Format chip from Stac Co. of Carlsbad, Cal. It should be noted that this particular integrated circuit also has the capability of also performing the functions of the read sequencer block 126. However, for purposes of clarity of explanation, the two blocks 126 and 32 are shown separately.

The head drive block 31 has a pair of bipolar transistors having their emitter electrodes coupled to ground through a resistor. Each base electrode of the transistors is connected to one of the differential output terminals of the write sequencer block 32 through a resistor. The collector electrodes of each of the bipolar transistors are connected to one of the input terminals of the write head 30, which has a third terminal connected to a voltage source at 12 volts. The sequencer block 32 differentially drives the transistor pair so that the head 30 creates a magnetic field in one direction or another as the magnetic tape passes near the gap of the head 30. In this way, the digital data signals from the host computer are written onto the magnetic tape.

As stated previously, the system of FIG. 1 is controlled by the control block 41. The control block controls the speed of the magnetic tape by control signals over a control line 56 to the servo speed controller 45. The control block 41 also controls the frequency of the clock signals for magnetic tape drive system. From the periodic signals from an oscillator 42, the clock divider 43 generates the clock signals for the system. Responsive to the control signal on a line 55 from the control block 41, the clock divider 43 can generate a higher frequency clock signal by dividing the oscillator signal by a smaller amount. Similarly, the clock divider 43 can slow the clock signal by dividing the oscillator signal by a greater amount.

The control block 41 controls and is responsive to an under-run counter 44 through a control line 58. The counter 44 counts the number of times the tape drive is interrupted, or the run of data transfer not completed, during the transfer of data over a predetermined period of time. If the data transfer is interrupted too often, i.e., the value in the counter 44 is too high, the control block 41 slows the transfer data rate.

For its own internal timing, the control block 41 is also directly connected to the oscillator 58 by a line 11.

FIG. 4 is a block diagram illustrating how a microprocessor 95, such as a Z80 from Zilog, Inc. of Sunnyvale, Cal. with RAM 98 (random access memory), EPROM 96 (electrically programmable read only memory) and a programmable I/O, input and output ports 93 and 94, could implement the control block 41. The block diagram is a typical arrangement by which the microprocessor 95 operates under control of software written into the EPROM 96. The RAM 98 serves as a "scratch pad" memory for the operations of the microprocessor 95.

Communication with the outside world is through an input port 93 for receiving signals, an output port 94 and address decoder 97 for sending signals. The microprocessor 95 also communicates over an address and data bus, shown as bus 54 in FIG. 1. This bus is a combination of address bus 18 and data bus 19 shown in FIG. 4.

Figure 2:
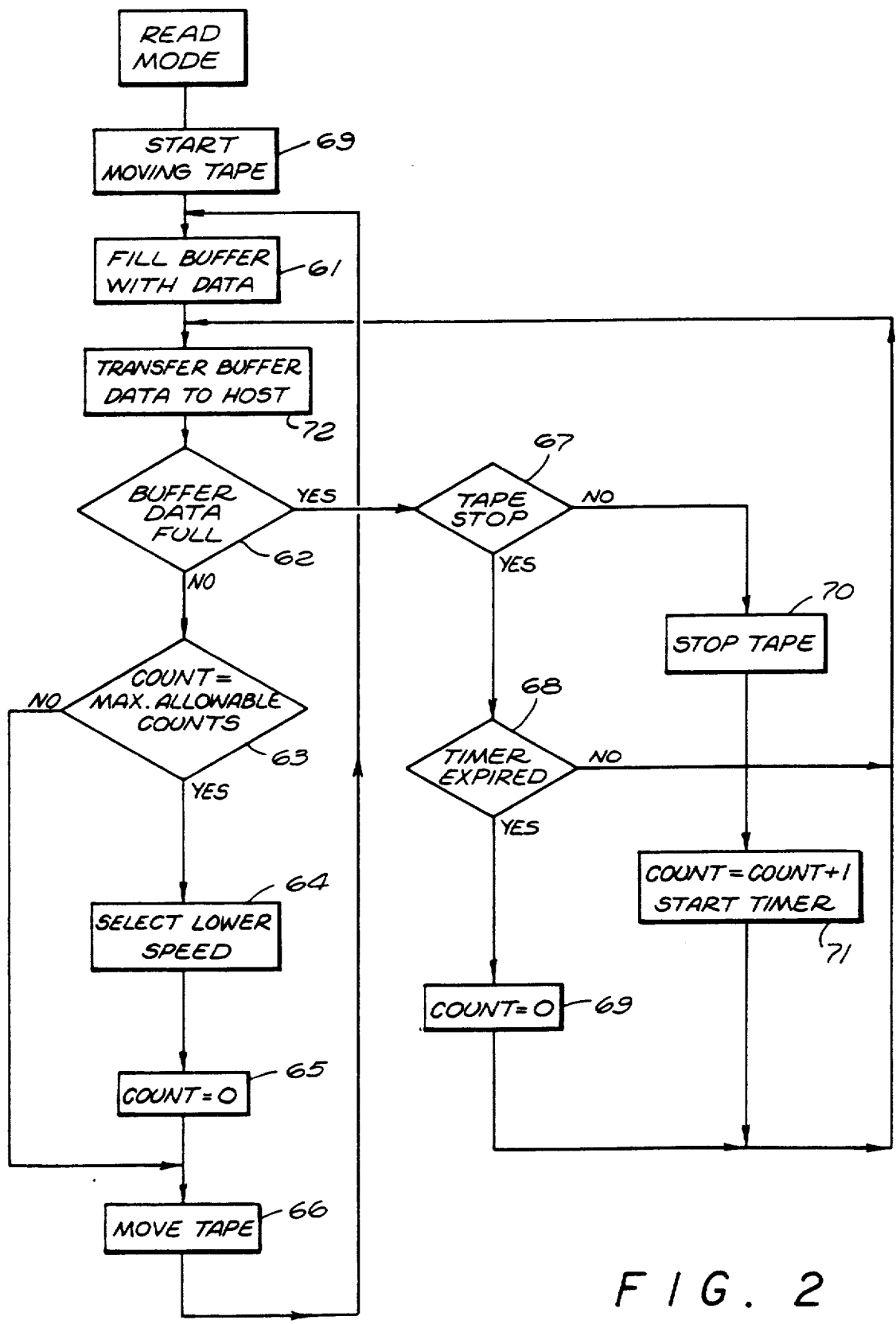
FIG. 2 is a flow chart illustrating the operation of the present invention in a read mode.
Figure 3:
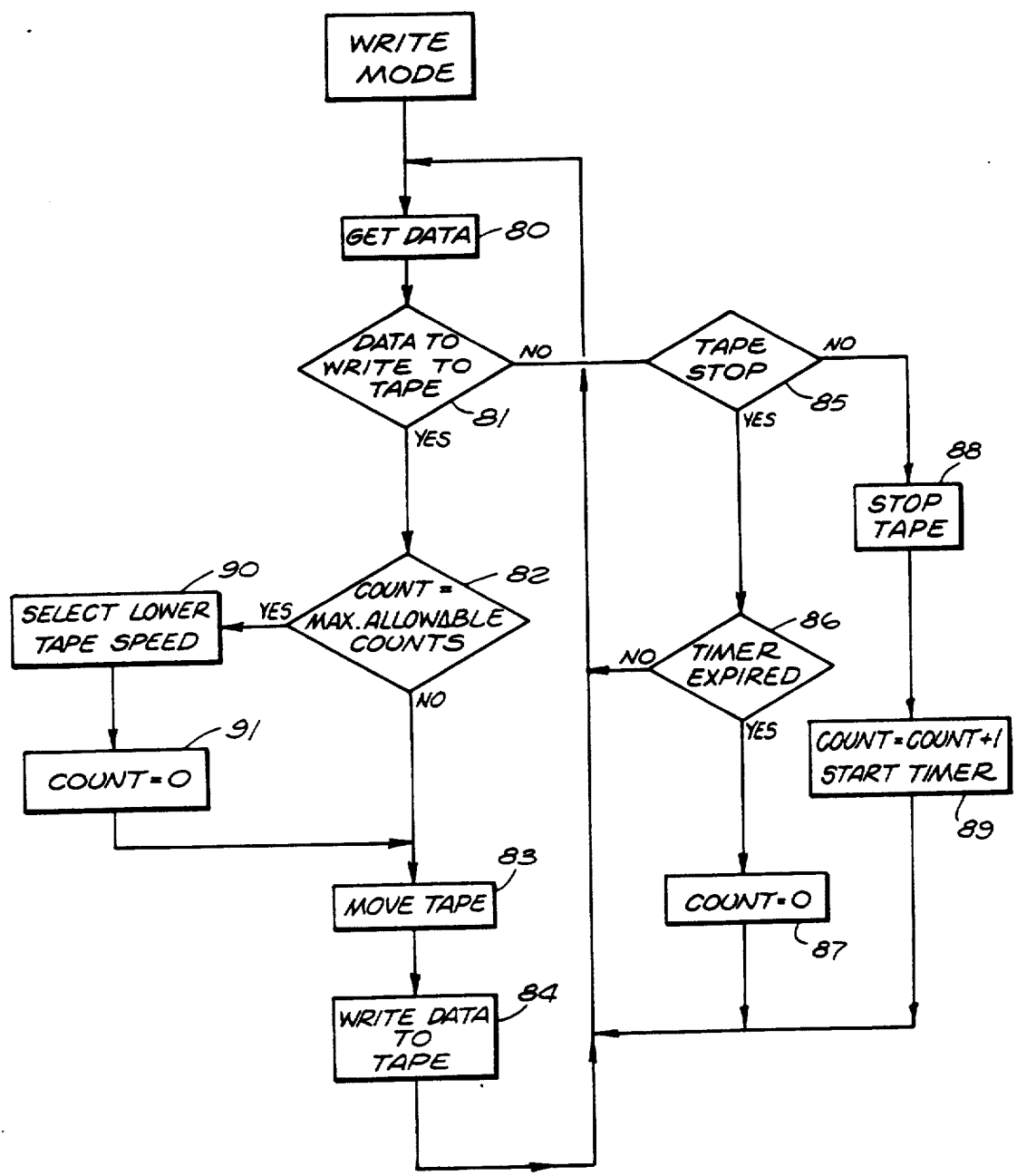
FIG. 3 is a flow chart illustrating the operation of the present invention in a write mode.

FIGS. 2 and 3 illustrate the read and write operations of a magnetic tape drive according to the present invention. The flow chart in FIG. 2 shows how throttling is initiated in the read mode operation. The flow chart has statements, indicative of operations, and decision or test points, indicative of branch operations. These operations are implemented by programs in the EPROM 96 for a microprocessor-based control block is used or by programs in the ROM section of the microcontroller for a microcontroller-based control block.

In the read operation, data are read from a magnetic tape and transferred into the host computer. The read operation is initiated when the control block 41 starts the movement of the magnetic tape by a command to the servo controller 45, as indicated by the statement 69. Then the buffer 46 is filled with data, as indicated by a statement 61, and by statement 72 the data is transferred from the buffer 46 to the host. Then by a decision branch 62 the control block 41 tests whether the buffer 46 is full or not.

If the determination is that the data buffer 46 is full, then the control block 41 determines whether the tape drive is stopped or not by decision branch 67. If the tape is stopped, then the next decision branch 68 is reached. The control block 41 determines whether a preset timer has expired. Typically this timer is in the control block 41. If the timer has not expired, then the operation resumes with filling the buffer 46 with data, operation 61. If the timer has expired, then the counter 44 is initialized, i.e., set to zero, by the operation 69 and then the read operation returns to filling the buffer 46 with data.

The counter 44 keeps a count of the number of times the drive is stopped in a data transfer operation. Nominally the reason for these interruptions is that the host computer in the read operation cannot keep up with the higher data transfer rate of the tape drive. The timer ensures the counter 44 counts the interruptions for a predetermined amount of time, and not for an indefinite period. For example, if the drive operation is temporarily completed and then restarted, the timer ensures that the counter 44 is reset for the restarted data transfer operation. A typical expiration time depends upon the host environment, but 10 milliseconds should be suitable for most cases.

If the decision branch 67 indicates that the tape is not stopped, then the operation 70 stops the tape and increments the counter 44 by one. An interruption has occurred. The timer is also started by the operation 71 if the timer is not already running. Then the operation continues sending the data to the host, statement 72, and checking whether the buffer 46 remains full or not, decision branch 62.

If, at the decision branch 62 the buffer 46 is not full, then the control block 41 moves to the next decision branch 63 to determine whether the number of interruptions as tallied in the counter 44 has exceeded the maximum allowable.

If the count does exceed the maximum allowable counts, then the control block 41 selects a lower speed for the magnetic tape drive, as indicated by the statement 64. The counter 44 is reset to zero, the statement 65, and the tape by the statement 66 is moved at a lower speed. The data transfer operation returns back to filling the buffer 46 with data at a lower transfer rate.

If the lower speed is better matched to the transfer rate of the host computer, then the buffer 46 remains unfilled in the next loop of the process flow. Since the counter 44 has been reset to zero, the decision branch 63 indicates that the number of interruptions do not exceed the maximum number allowable and the read operation continues on at the lower transfer rate.

If the lower transfer rate is still too fast for the host computer, then the buffer 46 fills again and by the decision branch 62 the tape is stopped and the counter 44 incremented until the maximum number of allowable interruptions is exceeded. Then by operation 64 the transfer rate is lowered once again. Thus the process flow continues until the drive transfer rate matches that of the host computer or until the drive's lowest transfer rate is reached. Data transfer is made at this rate with a lower number of interruptions.

FIG. 3 illustrates the write mode operation of a magnetic tape drive according to the present invention. In the write mode operation data from the host computer is to be recorded, or written, onto the magnetic tape.

In the first step, data is retrieved from the host computer by the operation 80. Then the control block 41 determines whether there is data in the buffer 46 by the decision branch 81. If the buffer 46 contains data which is to be written to the tape, then by the decision branch 82, the control block 41 determines whether the interruption count in the counter 44 has reached the maximum allowable number. If not, the data transfer operation continues. The tape is moved by the operation 83 and data is written to the tape by the operation 84. Then the process returns back to retrieving data from the host computer, the operation 80.

If the decision branch 82 is that the counter 44 is at the maximum number of allowable counts, then the tape is run at a slower tape speed by the operation 90 and the counter 44 is set to zero by the operation 91. Then the process returns back to the tape moving and writing operations 83. As in the case of the read mode operation, the write process flow stays at the lower transfer rate if the magnetic tape drive transfer rate matches that of the host computer. This condition is tested by decision branch 81.

If there is a mismatch in transfer rates, then the drive empties the buffer 46. By the determination of the decision branch 81, another decision branch 85 is reached. The control block 41 determines whether the tape is stopped or not. If the tape is stopped, then the next decision branch 86 is reached to determine whether the timer has expired or not. If the timer has not expired, then the read operation returns back to the operation 80. If the timer has expired, then the counter 44 is initialized and set to zero by the operation 87 and the write mode operation returns back to initial operation 80. As in the case of the read operation, the timer ensures that the number of interruptions in a predetermined amount of time is monitored before the drive speed is lowered.

If, at the decision branch 85 the tape is not stopped, then the tape is stopped by the operation 88. By the operation 89, the counter 44 is incremented by one and the timer is started. Then the write mode operation returns back to the data retrieval operation 80.

Once a lower transfer rate is selected for the drive the operation of the system can best be explained with reference to FIG. 1. In a read operation the control block 41 lowers the speed of the tape through a command control signal on the line 56 to the servo controller 45. Since the tape runs slower past the read head 20, the voltage signals generated in the head 20 are lower. To compensate for this, the control block 41 increases the gain of the amplifier 21.

The control block 41 performs this function by sending control signals over the control line 50 to the analog switch 27. It should be noted that while the control line 50 is shown as symbolicly as one signal line, more control lines may be represented for more gradation of control. Note, for example, that if there are three control lines 50, then eight different resistances 27A–27H could be connected to the switch 27 and eight levels of gain are available for the amplifier block 21. More than one control lines may also be used for other control lines, such as lines 51 and 52. As shown in FIG. 4, the control signals are sent out through the output port 94 for the microprocessor 95.

As mentioned previously, the switch 27 selects different resistance values to set the gain of the amplifier block 21. The application here is for an induction head for the read head 20. In the case of a thin film MR head, the gain adjustment is not required because no signal amplitude degradation occurs with a decrease in tape speed.

Through the tape read block 24, the control block 41 also can set the threshold level for digital transitions from one state to another. This function is important because during a write operation by a magnetic tape drive, the written data is also being read off the magnetic tape to check the integrity of the written signals. At this time it is desirable that the threshold be set high so that a clear signal track is laid down upon the magnetic tape. If the written signals do not meet the high threshold standard, then they must be rewritten. On the other hand, in a read operation the threshold level is set low (but still above the noise signal level) so that the maximum recovery can be made of the signals from the magnetic tape being read.

It should be noted that the control block 41 can also set the threshold through the gain in the amplifier block 21. Thus the control block 41 can adjust the threshold through the tape read block 24 (and the switch 28), the amplifier block 21 (and the switch 27) or a combination of both.

The control block 41 also selects the signals from the particular filter circuit 26, which matches the frequency range of the signals coming from the tape at the lowered tape speed. The clock signal to the phase-locked loop 25 is slowed by the control block 41 through control signals to the divider 43 over the line 55. The control block 41 also sends control signals to the loop 25 directly over the control line 57. Thus the buffer 46 receives data signals at a lower rate.

In this manner the control block 41 can selectively lower the transfer rate of the drive to best match the transfer rate of the host computer in a read operation.

Similarly the control block 41 can selectively lower the transfer rate of the drive in a write operation. By controlling the tape speed through the servo controller 45 and slowing the clock frequency from the divider 43 to the format block 32, the data from the host computer is written at a slower rate with the signal density unchanged on the tape. The transfer rate can be selectively lowered by a coordinated slowing of the tape speed and the rate at which the format block 32 generates signals to the block 31 for write head 30.

Thus, while the description above provides a full and complete disclosure of the preferred embodiments of the present invention, various modifications, alternate constructions and equivalents may be employed without departing from the true scope and spirit of the invention. Therefore, the present invention should be limited only by the metes and bounds of the appended claims.

What is claimed is:

1. A method of transferring data between a host device and a magnetic tape comprising the steps of:
    running a tape drive at a first tape speed to transfer data signals between said magnetic tape and a tape drive buffer at a tape drive data transfer rate;
    transferring digital data between said host device and said tape drive buffer at a host data transfer rate;
    transferring buffered data between said magnetic tape and said host device by way of said tape drive buffer;
    monitoring a state of said buffer during said buffered data transfer;
    interrupting said tape drive running in response to said state of said buffer to produce an adjusted tape drive data transfer rate for transfer of data between said magnetic tape and said tape drive buffer, said adjusted tape drive data transfer rate being lower than said tape drive data transfer rate to reduce effects of disparity between said tape drive data transfer rate and said host data transfer rate during said buffered data transfer; and than selectively changing said tape drive speed to a second tape speed in response to said monitoring to minimize said interrupting.

2. The method as in claim 1 wherein said changing step further comprising the step of:

changing said data transfer clock rate in response to said changing said tape drive to said second speed to maintain a constant data density on said magnetic tape during said running at said first and second tape speeds.

3. The method as in claim 2 wherein said step of running said tape drive further comprises the steps of:

writing said data signals upon said magnetic tape at said constant data density;

reading said written data signals from said magnetic tape; and then decoding said written data signals read from said magnetic tape based upon a threshold signal value adjusted in accordance with said selected speed to test said written data signals.

4. The method as in claim 1 further comprising the step of:

selectively filtering said data signals from said magnetic tape in accordance with said selected first or second tape speed.

5. The method as in claim 1 further comprising the step of:

selectively amplifying said data signals in accordance with said selected first or second tape speed.

6. The method as in claim 1 further comprising the step of:

decoding said data signals based upon a threshold signal value adjusted in accordance with said selected first or second tape speed.

7. The method as in claim 6 wherein said buffered data transfer is from said tape to said host device and said method further comprises the steps of:

amplifying said data signals in accordance with said first or second selected speed; and adjusting said threshold signal value in accordance with said first or second selected speed.

8. A magnetic tape drive system comprising:

a buffer;

tape drive means for moving magnetic tape at a controlled speed to transfer data between said magnetic tape and said buffer;

means for transferring data between a host device and said buffer at a nominal data transfer rate;

monitoring means for monitoring a state of buffer; and control means responsive to a state of said buffer for stopping and starting said magnetic tape moving to transfer data between said magnetic tape and said buffer at said nominal data transfer rate and for changing said controlled speed in response to said state, after said data transfer has begun, to minimize said stopping.

9. The magnetic tape drive system as in claim 8 wherein said control means further comprises:

means responsive to changes in said controlled speed for maintaining a constant data density on said magnetic tape.

10. The magnetic tape drive system as in claim 8 wherein said control means further comprises:

means for changing said controlled speed in a second period of time in accordance with the stopping in a previous period of time.

11. The magnetic tape drive system as in claim 8 further comprising:

a head for reading data signals from said magnetic tape; and means for selectively amplifying said data signals responsive to said control means.

12. The magnetic tape drive system as in claim 11 further comprising:

means for decoding said data signals in accordance with a threshold signal value; and means for adjusting said threshold signal value responsive to said controlled speed in said second period of time.

13. The magnetic tape drive system as in claim 12 wherein said means for selectively amplifying further comprises:

means for amplifying said data signals when said threshold signal value is changed during a data transfer from said magnetic tape to said host device at a changed nominal data transfer rate.

14. The magnetic tape drive system as in claim 11 further comprising:

filter block means for selectively filtering said data signals within a plurality of frequency ranges; and means for selecting one of said frequency ranges corresponding to said changed controlled speed.

15. The magnetic tape drive system as in claim 14 wherein said filter block means further comprises:

a plurality of filter circuits connected in parallel, each of said filter circuits blocking signals outside of one of said frequency ranges.

16. The magnetic tape drive system as in claim 11 further comprising:

a programmable active filter for selectively conditioning said data signals within a frequency range selected in response to said control means.

17. A magnetic data transfer system comprising:

buffer means for transferring data with a host at a host data transfer rate;

drive means for alternatively starting and stopping relative motion at a controlled speed between magnetic media and a magnetic head to transfer data between said buffer means and said magnetic media at media data transfer rate not greater than said host data transfer rate;

monitoring means for monitoring a state of buffer; and throttling means for changing said controlled speed in response to said state of said buffer means to minimize said stopping.

18. The invention of claim 17, wherein said throttling means further comprises:

means responsive to occurrences of stopping in a first time period for changing said controlled speed in a second time period.

19. The invention of claim 17, wherein said throttling means further comprises:

means for inhibiting said changing of said controlled speed to a lower controlled speed when said host data transfer rate is below a predetermined minimum.

20. The invention of claim 17, wherein said throttling means further comprises:

means for increasing said controlled speed when said media data transfer rate is below said host data transfer rate during a predetermined period.

21. The invention of claim 17, wherein said drive means further comprises:
   means responsive to said controlled speed for maintaining a constant data density on said magnetic media at different controlled speeds.

22. The invention of claim 17, wherein said drive means further comprises:
   a head for reading data signals from said magnetic media; and
   means for amplifying said data signals at a level related to said controlled speed.

23. The invention of claim 22, wherein said drive means further comprises:
   means for decoding said data signals in accordance with a threshold signal value; and
   means for adjusting said threshold signal value in accordance with said controlled speed.

24. The invention of claim 17, wherein said drive means further comprises:
   means for selectively filtering said data signals within a plurality of nominal frequency ranges; and
   means for selecting one of said nominal frequency ranges in accordance with said controlled speed.

25. A method of operating a magnetic data transfer system comprising the steps of:
   transferring data between a buffer and a host at a host data transfer rate;
   alternatively starting and stopping relative motion at a controlled speed between magnetic media and a magnetic head to transfer data between said magnetic media and said buffer at an media data transfer rate not greater than said host data transfer rate; and
   minimizing said stopping by changing said controlled speed.

26. The invention of claim 25, wherein said minimizing step further comprises the steps of:
   monitoring a state of said buffer; and then
   changing said controlled speed in response thereto.

27. The invention of claim 25, wherein said minimizing step further comprises the steps of:
   monitoring said stopping during a first time period; and then
   changing said controlled speed during a second time period in response thereto.

28. The invention of claim 25, wherein said minimizing step further comprises the step of:
   inhibiting said changing of said controlled speed to a lower controlled speed when said host data transfer rate is below a predetermined minimum.

29. The invention of claim 25, wherein said minimizing step further comprises:
   increasing said controlled speed when said media data transfer rate is below said host data transfer rate during a predetermined period.

30. The invention of claim 25, further comprising the step of:
   maintaining a constant data density on said magnetic media at different controlled speeds.

31. The invention of claim 25, wherein said starting and stopping step further comprises the steps of:
   reading data signals from said magnetic media; and
   amplifying said data signals at a level related to said controlled speed.

32. The invention of claim 31, wherein said starting and stopping step further comprises the steps of:
   decoding said data signals in accordance with a threshold signal value; and
   adjusting said threshold signal value in accordance with said controlled speed.

33. The invention of claim 25, wherein said starting and stopping means further comprises:
   selectively filtering said data signals within a plurality of nominal frequency ranges; and
   selecting one of said nominal frequency ranges in accordance with said controlled speed.

* * * * *

UNITED STATES PATENT AND TRADEMARK OFFICE
CERTIFICATE OF CORRECTION

PATENT NO. : 5,303,095
DATED : APRIL 12, 1994
INVENTOR(S) : Binh Vuong

It is certified that error appears in the above-indentified patent and that said Letters Patent is hereby corrected as shown below:

| COLUMN | LINE | |
|---|---|---|
| TITLE | | change "CONTROLLING" to --CHANGING-- |
| 1 | 2 | change "CONTROLLING" to --CHANGING-- |
| 1 | 26 | after "acts", insert --as-- |
| 4 | 15 | change "are" to --is-- |
| 4 | 31 | second appearance of "41" should be --46-- (i.e., --buffer 46--) |

UNITED STATES PATENT AND TRADEMARK OFFICE
CERTIFICATE OF CORRECTION

PATENT NO. : 5,303,095
DATED : April 12, 1994
INVENTOR(S) : Binh Vuong

It is certified that error appears in the above-indentified patent and that said Letters Patent is hereby corrected as shown below:

| Col. | line | |
|---|---|---|
| 5 | 56 | delete the phrase "is used" |
| 5 | 63 | change "69" to --60-- |
| 9 | 4 | change "than" to --then-- |
| 11 | 34 | change "an" to --a-- |

Figure 2 of the Drawings: Block "Start Moving Tape" should be labeled --60-- instead of "69".

Signed and Sealed this

Sixteenth Day of May, 1995

*Attest:*

BRUCE LEHMAN

*Attesting Officer*     *Commissioner of Patents and Trademarks*